(12) United States Patent
Stephens

(10) Patent No.: US 10,378,170 B2
(45) Date of Patent: Aug. 13, 2019

(54) ANIMAL TRAP DISPOSABLE ANCHOR DRIVER

(71) Applicant: Carlis Glen Stephens, Warrenton, MO (US)

(72) Inventor: Carlis Glen Stephens, Warrenton, MO (US)

(*) Notice: Subject to any disclaimer, the term of this patent is extended or adjusted under 35 U.S.C. 154(b) by 0 days.

(21) Appl. No.: 16/135,656

(22) Filed: Sep. 19, 2018

(65) Prior Publication Data

US 2019/0093301 A1    Mar. 28, 2019

Related U.S. Application Data

(60) Provisional application No. 62/561,807, filed on Sep. 22, 2017.

(51) Int. Cl.
| | |
|---|---|
| *E02D 5/80* | (2006.01) |
| *E04C 5/12* | (2006.01) |
| *A01M 23/24* | (2006.01) |
| *A01M 23/16* | (2006.01) |
| *A01M 23/02* | (2006.01) |

(52) U.S. Cl.
CPC .............. *E02D 5/80* (2013.01); *A01M 23/02* (2013.01); *A01M 23/16* (2013.01); *A01M 23/24* (2013.01); *E04C 5/12* (2013.01)

(58) Field of Classification Search
CPC   E02D 5/80; E02D 5/801; E02D 5/803; E04C 5/12
See application file for complete search history.

(56) References Cited

U.S. PATENT DOCUMENTS

| | | | | |
|---|---|---|---|---|
| 4,993,870 A | * | 2/1991 | Bridgewater | E02B 3/126 405/15 |
| 5,171,108 A | * | 12/1992 | Hugron | E02D 5/80 405/244 |
| 5,775,037 A | * | 7/1998 | James | E02D 5/74 256/DIG. 5 |
| 5,881,506 A | * | 3/1999 | Chapman | E02D 5/803 405/259.1 |
| 6,237,289 B1 | * | 5/2001 | Jewett | E02D 5/803 405/259.1 |
| 6,238,143 B1 | * | 5/2001 | Zablonski | E02D 5/803 405/259.1 |
| 8,484,886 B2 | | 7/2013 | Stephens | |
| 8,881,447 B2 | | 11/2014 | Stephens | |
| 8,898,952 B2 | | 12/2014 | Stephens | |
| 9,173,390 B2 | | 11/2015 | Stephens | |

(Continued)

*Primary Examiner* — Justin M Benedik
(74) *Attorney, Agent, or Firm* — Sandberg Phoenix & von Gontard P.C.

(57) ABSTRACT

An animal trap (T) has an attached chain (C) and anchor (A). A driver (10) for driving the anchor into the ground has a shaft (12) with upper and lower sections (12A, 12B), the upper section having a smaller diameter than the lower section. The bottom (14) of the shaft is contoured to mate with the anchor. A handle (16) facilitates removal of the shaft from the ground after the anchor is driven into place. The handle has a sleeve (18) slidably fitting over the upper section of the shaft and an arm (22) extending outwardly from the sleeve for grasping by a user of the driver. A cap (24) fits onto the upper end of the shaft and is struck by a tool used to drive the shaft into the ground and set the anchor in place.

13 Claims, 3 Drawing Sheets

(56) References Cited

U.S. PATENT DOCUMENTS

| | | | |
|---|---|---|---|
| 2002/0007775 A1* | 1/2002 | Woyjeck | A01K 1/04 114/294 |
| 2010/0058680 A1* | 3/2010 | Agg | E02D 5/74 52/163 |
| 2010/0223862 A1* | 9/2010 | Smit | E02D 5/801 52/157 |
| 2012/0243949 A1* | 9/2012 | Schneider | E02D 5/80 405/302.7 |
| 2014/0112723 A1* | 4/2014 | Daniel | E02D 5/80 405/259.1 |
| 2014/0227041 A1* | 8/2014 | Stroyer | E02D 5/80 405/252.1 |
| 2015/0040491 A1* | 2/2015 | Frank | E02D 5/801 52/157 |
| 2016/0032551 A1* | 2/2016 | Yackley | E02D 5/80 52/156 |
| 2016/0083926 A1* | 3/2016 | Rosier | E02D 5/80 52/155 |
| 2016/0102442 A1* | 4/2016 | Somerfield | E02D 5/80 52/163 |
| 2016/0298311 A1* | 10/2016 | Green | E04H 15/60 |
| 2017/0058480 A1* | 3/2017 | Hermans | E02D 5/80 |
| 2017/0089025 A1* | 3/2017 | Chilson | E02D 5/803 |

* cited by examiner

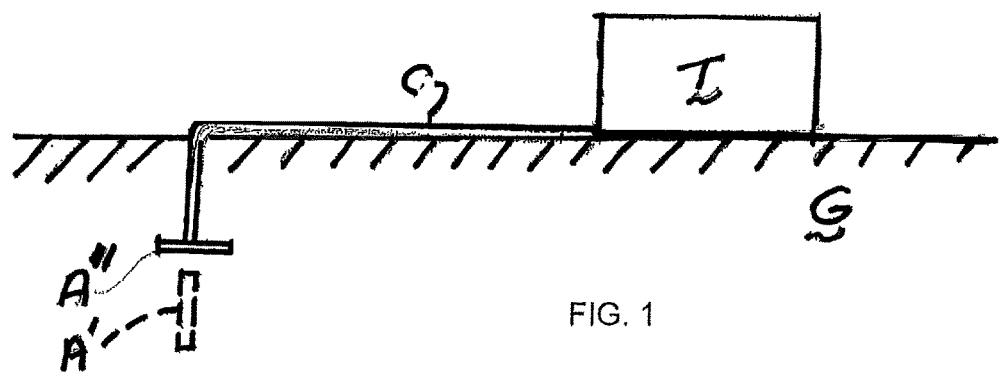
FIG. 1
FIG. 2A
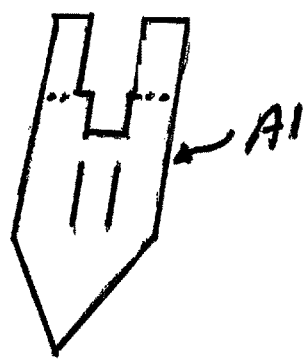
FIG. 2B
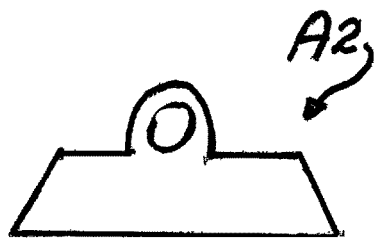

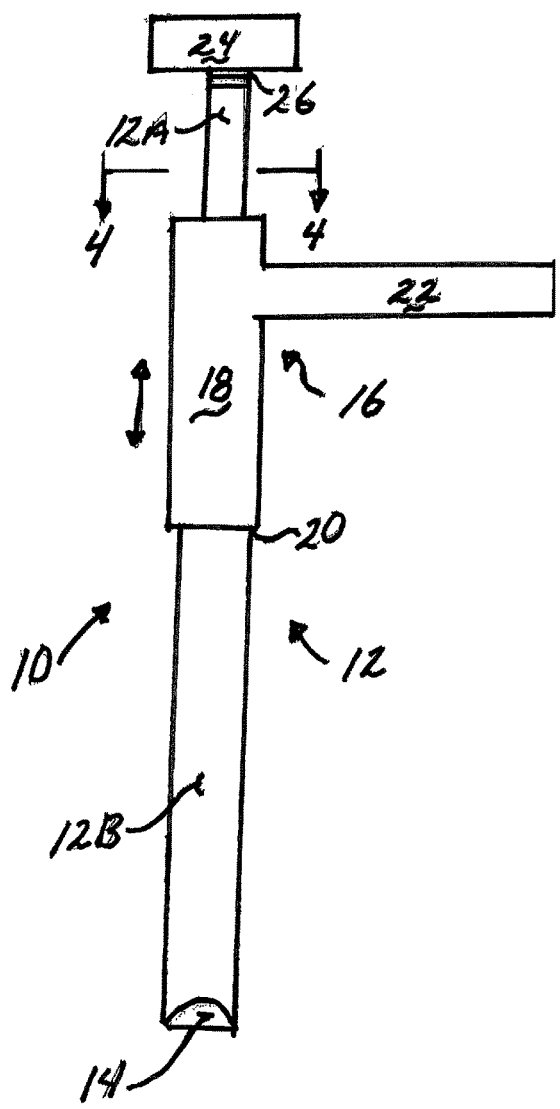
FIG. 3A
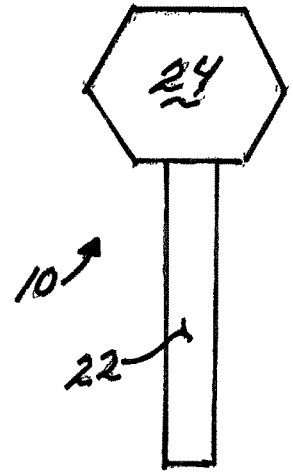
FIG. 3B
FIG. 3C
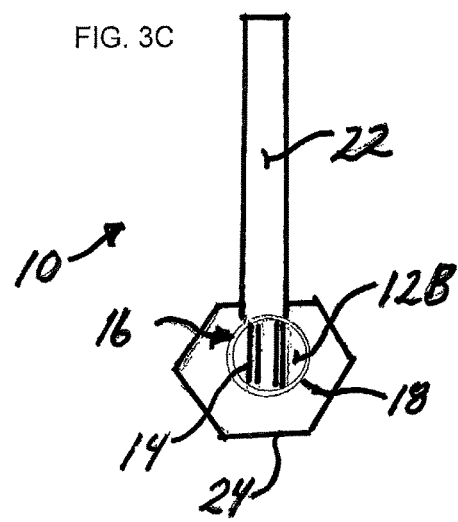

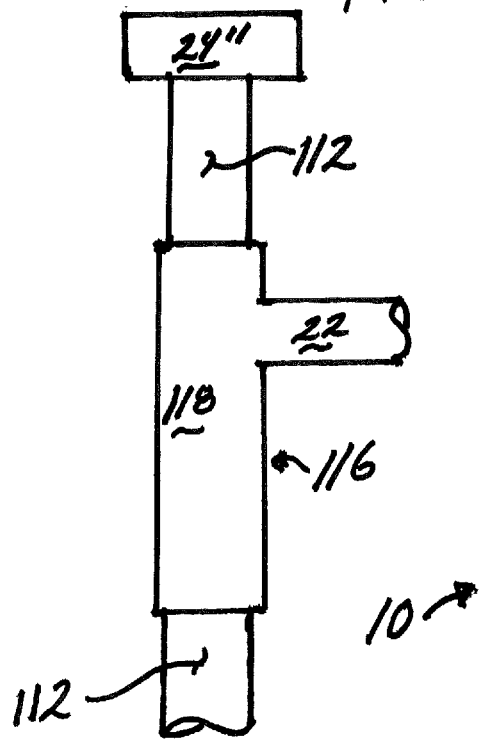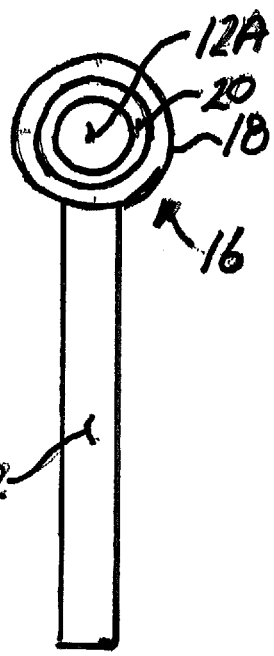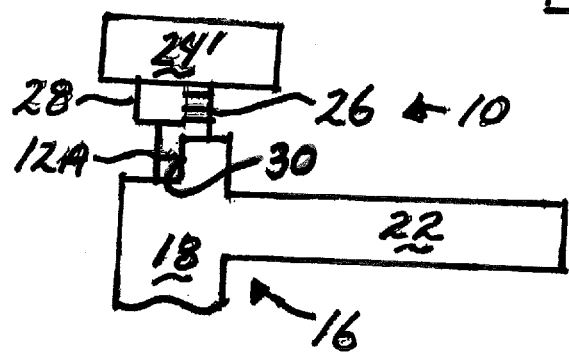
FIG. 6
FIG. 4
FIG. 5

ANIMAL TRAP DISPOSABLE ANCHOR DRIVER

CROSS REFERENCE TO RELATED APPLICATION

This application is related to and claims benefit of provisional patent application Ser. No. 62/561,807 filed on Sep. 22, 2017, which is fully incorporated herein by reference and made a part hereof.

BACKGROUND OF THE INVENTION

This invention relates to anchors for animal traps; and, more particularly, to an improved driver for use with disposable anchors to drive the anchors into the ground and secure the animal traps in desired locations.

Animal traps such as those shown and described in my U.S. Pat. Nos. 9,173,390, 8,898,952, 8,881,447, and 8,484,886 are used to trap small animals such as raccoons and the like. To facilitate trapping an animal, a trapper tries to determine a location where the animal will likely pass by, stop to feed or rest, etc. and set the trap at that location. It will be understood by those skilled in the art that unless a trap is firmly fixed in place, it may be dislodged by an animal, wind, rain, etc.

Accordingly, many traps are provided with a length of chain with one end of the chain fixed to the trap. The other, free end of the chain has an associated anchor which is driven into the ground to hold the trap in place. Typically the anchor is a disposable anchor meaning that once driven into the ground it stays there when the trap is subsequently moved.

To drive an anchor into the ground, a trapper employs a driver having one end contoured to be removably attached to the anchor. Once an anchor is affixed to this end of the driver, and the anchor is set in place, the trapper uses a hammer to repeatedly strike the upper end of the driver to drive it and the attached anchor into the ground. Once the anchor is driven a sufficient distance into the ground, the trapper pulls the driver out of the ground leaving the anchor in place.

A major problem with conventional drivers is that to assist the trapper in pulling the driver out of the ground, the driver has a handle attached to it which the trapper can grasp and pull upwards on, so to help pull the driver out of the ground. Conventional drivers have this handle welded to, or otherwise affixed to, the driver shaft. A major problem with conventional driver construction is that, over time, due to the pounding on the driver by the hammer in driving the anchor into the ground, fractures occur where the handle and driver shaft are joined. Then, when the trapper tries to pull the driver out of the ground using the handle, the handle breaks off. While this does not necessarily make the driver unusable, though it may, it does make it much more difficult for the trapper to pull the driver out of the ground, making the driver inconvenient to use.

BRIEF SUMMARY OF THE INVENTION

The present invention is directed to an improved animal trap disposable anchor driver.

The improved driver has an elongated shaft with a lower end of a first diameter and an upper end of a second and reduced diameter. The base of the driver shaft is contoured for attachment to an anchor to be driven into the ground. The upper end of the shaft is threaded for a nut to be secured to the shaft, the nut forming an upper end of the driver which is repeatedly struck by a hammer to drive the shaft into the ground. A sleeve is received on the reduced diameter portion of the shaft, the sleeve being freely movable along the reduced diameter portion thereof. The sleeve has an arm extending at a right angle to it, the arm forming a handle by which a trapper can pull the driver out of the ground. Because the sleeve is freely movable, forces imparted to the driver when struck by a hammer are not transferred to the sleeve or handle, so the handle is not damaged or fractured by repeated blows to the driver.

In a second embodiment of the invention, the nut has a circumferential flange depending beneath the bottom of the cap and extending partially around the underside of the cap. A correspondingly sized and shaped notch is formed at the upper end of the handle sleeve for the flange to be received in the notch and solidly connect the cap and sleeve together to make it easier for a user to dislodge the end of the driver connected to an anchor and lift the driver out of the ground.

In yet another embodiment of the invention, the diameter of the driver shaft is uniform throughout its length and the handle has a sleeve which fits over the driver shaft. An inner diameter of the sleeve is slightly larger than the diameter of the driver so to move freely up and down the shaft. The driver shaft again has a nut secured to its upper end and against which the upper end of the handle sleeve abuts which forced moved upwardly along the shaft in order to pull the driver out of the ground.

Other objects and features will be in part apparent and in part pointed out hereinafter.

BRIEF DESCRIPTION OF THE SEVERAL VIEWS OF THE DRAWINGS

The accompanying figures, together with the detailed description which follows, form part of the specification and illustrate the various embodiments described in the specification.

FIG. 1 is a simplified representation of an animal trap anchored to the ground;

FIGS. 2A and 2B are illustrations of disposable anchors;

FIG. 3A is an elevation view of an improved driver of the present invention, FIG. 3B is a top plan view of the driver, and FIG. 3C is a bottom plan view thereof;

FIG. 4 is a plan view of the driver taken along line 4-4 in FIG. 3A;

FIG. 5 is a partial elevation view of a second embodiment of the invention; and, FIG. 6 is a cross-sectional view of a driver having a uniform diameter along its length, and a handle for use with the driver.

Corresponding reference characters indicate corresponding parts throughout the several views of the drawings.

DETAILED DESCRIPTION OF INVENTION

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to FIG. 1, an animal trap T is set upon the ground G in a desired location. To prevent the trap from being intentionally or inadvertently moved from that location, trap T has an associated chain C one end of which is attached to the trap. At the other end of the chain, an anchor A is attached to the chain, and this anchor is driven into the ground, as shown in FIG. 1, to a desired depth. FIG. 2 illustrates two types of anchors indicated generally A1 and A2 used for this purpose. The type of anchor used to stake trap T in place forms no part of this invention.

When in place, anchor A anchors the trap in the desired location and prevents the trap's movement from that location. As shown in FIG. 1, when driven into the ground by a driver 10, the anchor is oriented vertically as indicated at A'; while, when driver 10 is pulled out of the ground, the anchor is pulled into a horizontal position indicated A" and remains there. The present invention is directed to an improvement to a driver used to stake the anchor in the ground so to fix the trap in place.

The improved driver 10 of the present invention is shown in FIGS. 3A-3C, and 4. As shown in these drawings, driver 10 has a driver shaft 12 with an upper section 12A and a lower section 12B. Lower section 12B of the shaft has a first diameter and the upper section 12A of the shaft has a second and reduced diameter. As shown in FIGS. 3A and 3C, a bottom or base 14 of driver shaft 12 is contoured to mate with an anchor A1 or A2 to be driven into the ground using driver 10.

Driver 10 next has a handle 16 for use by the person using the driver to assist the user in removing the driver from the ground after an anchor A has been driven into the ground. Handle 16 first includes a sleeve 18 having an inner diameter that allows the sleeve to slidably fit over the reduced diameter upper section 12A of driver shaft 12. Sleeve 18 is shorter than the length of section 12A, and so reciprocally moves along the length of section 12A striking against the underside of a nut 24 which forms the top of driver 10 and abutting against a shoulder 20 formed between upper section 12A and larger diameter section 12B of the shaft. Handle 16 next includes an arm 22 extending outwardly, generally at a right angle, from sleeve 18. Arm 22 is grasped by the user of driver 10 to help pull the driver out of the ground once an anchor is driven into place.

Those skilled in the art will appreciate that while driver 10 is of a forged or cast metal construction, handle 16 can either be of metal or a plastic. If of plastic, the handle is molded using a heavy duty type plastic material.

Next, driver 10 includes a cap 24 which fits onto the upper end of shaft 12. For this purpose, the upper end section 12A of shaft 12 is threaded as indicated at 26 and cap 24 comprises a hexagonally shaped threaded nut which is threaded onto the top of shaft 12. Cap 24 acts an anvil which is struck by a tool; e.g. a hammer or sledge hammer (both not shown), wielded by the user to drive shaft 12 into the ground and set anchor A in place.

Unlike conventional anchor drivers in which a handle is cast with the driver shaft, or welded onto the shaft, handle 16 is not subjected to the repeated forces which the driver sustains as an anchor is driven into the ground by pounding on the top of the driver with a hammer. As previously noted, with conventional drivers the handle oftentimes fractures and cannot thereafter be used to aid in pulling the driver out of the ground. Rather with the improved driver 10 of the present invention, when the driver is struck with a hammer, sleeve 16 of handle 14 will move up and down along the length of section 12A of shaft 12, and may abut against the bottom of cap 24, or strike against the shoulder 20 where the upper and lower sections of shaft 12 meet, but the forces to which arm 22 are subjected in doing so are significantly less than those to which the handle arm of conventional drivers are subjected and these forces are not sufficient to cause arm 22 to fracture. Accordingly, even after substantial repeated use, driver 10 will not be subject to a failure of its handle assembly 16 and will not need to be replaced.

When the user subsequently extracts the driver from the ground, he pulls arm 22 up against the underside of cap 24. Thereafter, continued pulling on the arm will help pull the driver out of the ground.

Turning now to FIG. 5, in a second embodiment of the invention, a cap 24' threaded onto the upper end of section 12A of the shaft has a circumferential flange 28 that depends beneath the bottom of the cap and extends partially around the underside of the cap. A correspondingly sized and shaped notch 30 is formed at the upper end of sleeve 18 for the flange to be received in the notch to connect the cap and sleeve together. Now, when a user wants to extract driver 10 from the ground, they can interconnect the cap and sleeve, by pulling upward on arm 22, so to form a solid connection between handle 16 and the head of the driver represented by cap 24'. This interlocking arrangement is particularly useful when driver 10 is being used with anchors such as those shown in FIG. 2B since it makes it easier for the user to twist the driver and free the contoured end of the driver from the anchor prior to lifting the driver out of the ground. Previously, when a driver was used with an anchor such as that shown in FIG. 2B, to dislodge the end of the driver connected to the anchor, the user required another tool such as a pair of pliers or a nut welded to a wrench to twist the driver and disconnect it from the anchor. The solid interlocking connection described above now makes it easier for the user to effect this disconnection and by pulling up on arm 22 of handle 16 to lift the driver out of the ground.

Finally, referring to FIG. 6, those skilled in the art will understand that shaft 12 of driver 10, rather than having two sections each of a different diameter, can comprise a shaft 112 of uniform diameter along its entire length. In this embodiment, a sleeve 118 of a handle 116 has an inner diameter slightly larger than the diameter of the uniform diameter shaft 112 so to slidably move along the shaft. Now, a nut 24" is connected to the top of shaft 120. In addition, a nut (not shown) may optionally be located on shaft 112, intermediate the ends of the shaft, and welded to the shaft to provide a shoulder against which the lower end of sleeve 118 would abut. Use of the driver to set an anchor A into the ground and then be withdrawn from the ground, once the anchor is in place, is as previously described.

In view of the above, it will be seen that the several objects and advantages of the present disclosure have been achieved and other advantageous results have been obtained.

Having thus described the invention, what is claimed and desired to be secured by Letters Patent is:

1. In an animal trap to which is attached one end of a chain with an anchor affixed to the other end thereof for anchoring the trap in the ground at a desired trap location and preventing movement of the trap from that location, a driver being used to stake the anchor in the ground so to fix the trap in place, the driver having a shaft a bottom end of which is contoured to mate with the anchor driven into the ground using the driver and remaining in the ground after the driver is removed from the ground, and a cap attached to the driver shaft at its upper end, the cap being struck by a tool wielded by the user to drive the shaft into the ground and set the anchor in place:

a handle for use by the person using the driver to assist the user in removing the driver from the ground after the anchor been driven into the ground, the handle including a sleeve having an inner diameter slightly larger than the diameter of the shaft for the sleeve to be slidably received on the shaft and reciprocally move along the shaft wherein the handle can form an interlocking relationship with the cap to prevent rotation of the sleeve.

2. The handle of claim 1 in which the shaft has an upper section and a lower section, the upper section having a diameter smaller than the diameter of the lower section and the inner diameter of the sleeve being such that the handle is slidably received on, and reciprocally moves along, only on the upper section of the shaft.

3. The handle of claim 2 further including an arm extending outwardly from the sleeve intermediate the length of the sleeve, the arm being grasped by the user to help extract the driver from the ground.

4. The handle of claim 1 in which the driver shaft is uniform in diameter along its length.

5. The handle of claim 4 further including a stop positioned along the shaft intermediate the length of the shaft, the stop limiting the extent of reciprocal motion of the sleeve along the length of the shaft.

6. The handle of claim 1 wherein the cap comprises a threaded nut and the upper end of the upper section of the shaft is threaded for receiving the nut onto the shaft.

7. The handle of claim 1 in which the driver is made of a forged or cast metal with the handle being of a metal or plastic construction.

8. The handle of claim 7 in which if the handle is of plastic it is of a molded construction using a heavy duty type plastic.

9. The handle of claim 1 wherein the cap has a circumferential flange depending beneath a bottom of the cap and extending partially around an underside of the cap, and a notch is formed at an upper end of the sleeve, the notch being sized and shaped to conform to the flange of the cap for the flange to be received in the notch and interlock the cap and handle together to help a user extract the driver from the ground.

10. In an animal trap having an attached chain and anchor for anchoring the trap in the ground at a desired location to prevent movement of the trap from that location, an improvement to a driver used to stake the anchor in the ground so to fix the trap in place, the improvement comprising:

a driver shaft having an upper section and a lower section, the lower section of the shaft having a first diameter and the upper section of the shaft having a second and reduced diameter;

a bottom of the second section of the shaft being contoured to mate with an anchor to be driven into the ground with the driver, the anchor remaining in the ground after being driven into the ground and the driver extricated from the ground;

a cap fitting onto the shaft at the upper end of the upper section of the shaft to form a top of the driver and having a circumferential flange depending beneath the bottom of the cap and extending partially around an underside of the cap, the cap being struck by a tool wielded by the user to drive the shaft into the ground and set the anchor in place; and, a handle for use by the person using the driver to facilitate the user removing the driver from the ground after the anchor been driven into the ground, the handle including a sleeve shorter in length than the upper section of the shaft and having an inner diameter by which the sleeve is slidably received on the upper section, the sleeve moving between an underside of the cap, to mate with the circumferential flange, and abutting against a shoulder formed between the upper and lower sections of the shaft, the handle further including an arm extending outwardly from the sleeve for grasping by the user of the driver whereby the user pulling upwardly on the arm lifts the driver out of the ground.

11. The improvement of claim 10 further including a notch is formed at an upper end of the sleeve of the handle, the notch being sized and shaped to conform to the flange of the cap for the flange to be received in the notch and connect the cap and handle together so a user can readily twist the driver detach the shaft from an anchor driven into the ground by the driver and extract the driver from the ground.

12. In an animal trap having an attached chain and anchor for anchoring the trap in the ground at a desired location to prevent movement of the trap from that location, an improvement to a driver used to stake the anchor in the ground so to fix the trap in place, the improvement comprising:

a driver shaft of a uniform diameter along its length, a bottom of the shaft contoured to mate with an anchor to be driven into the ground with the driver, the anchor remaining in the ground after being driven into the ground and the driver extricated from the ground;

a cap fitting onto the upper end of the shaft to form a top of the driver, the cap being struck by a tool wielded by the user to drive the shaft into the ground and set the anchor in place; and, a handle for use by the person using the driver to facilitate the user removing the driver from the ground after the anchor been driven into the ground, the handle including a sleeve having an inner diameter slightly larger than the diameter of the shaft by which the sleeve is slidably received on the shaft wherein the handle can form an interlocking relationship with the cap to prevent rotation of the sleeve.

13. The improvement of claim 12 further including a nut attached to the shaft intermediate the length of the shaft for the sleeve to move between an underside of the cap and abutting against a shoulder formed by the nut, the handle further including an arm extending outwardly from the sleeve for grasping by the user of the driver whereby the user pulling upwardly on the arm lifts the driver out of the ground.

* * * * *